United States Patent
Naik et al.

(10) Patent No.: US 8,508,895 B2
(45) Date of Patent: Aug. 13, 2013

(54) SHORT CIRCUIT PROTECTION FOR SENSOR

(75) Inventors: Dinesh Naik, Bangalore (IN); Sudheer Beligere, Bangalore (IN); ShanoPrasad Kunjappan, Bangalore (IN); Manick Ghosh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 256 days.

(21) Appl. No.: 13/074,615

(22) Filed: Mar. 29, 2011

(65) Prior Publication Data

US 2012/0250192 A1 Oct. 4, 2012

(51) Int. Cl.
*H02H 9/00* (2006.01)
(52) U.S. Cl.
USPC .................................................. 361/58
(58) Field of Classification Search
USPC .................................................. 361/58
See application file for complete search history.

(56) References Cited

U.S. PATENT DOCUMENTS

| | | | | |
|---|---|---|---|---|
| 5,973,416 A | * | 10/1999 | Guenther | 307/125 |
| 7,068,010 B2 | * | 6/2006 | Youm | 318/778 |
| 2002/0167770 A1 | * | 11/2002 | Kato et al. | 361/58 |
| 2003/0048008 A1 | * | 3/2003 | Castagnet et al. | 307/131 |

* cited by examiner

*Primary Examiner* — Scott Bauer
(74) *Attorney, Agent, or Firm* — Shumaker & Sieffert, P.A.

(57) ABSTRACT

This disclosure is directed to techniques for protecting a sensor from a short to a power supply. According to one example consistent with these techniques, a circuit or device may include a sensor unit and a short protection unit. The sensor unit may generate at least one signal indicative of at least one measured property. The sensor unit may be configured to communicate the at least one generated signal via an output node coupled to the sensor unit. The short protection unit may determine whether the output node is electrically coupled to a power supply input. The short protection unit may, if the output node is electrically coupled to the power supply input, provide at least one auxiliary load between the sensor unit and the output node, and thereby protect the sensor unit to prevent the sensor unit from operating undesirably and/or to prevent the sensor unit from damage.

19 Claims, 5 Drawing Sheets

SHORT CIRCUIT PROTECTION FOR SENSOR

TECHNICAL FIELD

This disclosure relates generally to sensor circuits and, more specifically, the protection of sensor circuits from a short to a power supply.

BACKGROUND

Sensors, for example rotary position sensors, may operate based on one or more power supplies. In some circumstances, one or more input and/or output connections of a sensor may become electrically coupled ("shorted") to a power supply. Such a short may cause a sensor to operate undesirably, or some cases even damage or the sensor.

SUMMARY

This disclosure is directed to techniques for protecting a sensor unit from an electrical short (electrical coupling, also referred to as a "short") to a power supply. According to these techniques, a circuit/device that includes the sensor unit may further include a short protection unit. The short protection unit may be configured to determine whether an electrical coupling (short) has occurred between an output node communicatively coupled to the sensor unit and a power supply. If the short protection unit determines that such an electrical coupling has occurred, the short protection unit may provide an auxiliary load between the output node and the sensor unit. However, if the short protection unit does not determine such an electrical coupling has occurred, the short protection unit may remove the auxiliary load between the output node and the sensor unit. According to these techniques, a sensor unit may be protected from a power supply short, without one or more loads coupled to the sensor unit (via the output node) including additional circuitry or devices for impedance matching purposes.

For example, a method is described herein. The method includes generating, by a sensor unit, at least one signal indicative of at least one measured property, wherein the sensor unit is operated based one power received via at least one power supply input. The method further includes communicating, by the sensor unit, the at least one signal via an output node coupled to the sensor unit. The method further includes determining whether the output node is electrically coupled to the power supply input. The method further includes providing at least one auxiliary load between the sensor unit and the output node if the output node is electrically coupled to the power supply input.

As another example, a device is described herein. The device includes a sensor unit configured to generate at least one signal indicative of at least one measured property and communicate the at least one signal via an output node coupled to the sensor unit, wherein the sensor unit is operated based on power received via at least one power supply input. The device further includes an output voltage detection unit configured to determine whether the output node is electrically coupled to the at least one power supply input. The device further includes a switch unit configured to provide at least one auxiliary load between the sensor unit and the output node if the output node is electrically coupled to the at last one power supply input.

According to another example, a device is described herein. The device includes means for generating at least one signal indicative of at least one measured property, wherein the means for generating is operated based on power received via at least one power supply input. The device further includes means for communicating the at least one signal via an output node coupled to the means for generating. The device further includes means for determining whether the output node is electrically coupled to the at least one power supply input. The device further includes means for providing at least one auxiliary load between the means for generating and the output node if the output node is electrically coupled to the at least one power supply input.

The details of one or more examples described herein are set forth in the accompanying drawings and the description below. Other features, objects, and advantages of the techniques described herein will be apparent from the description and drawings, and from the claims.

DETAILED DESCRIPTION

Figure 1:
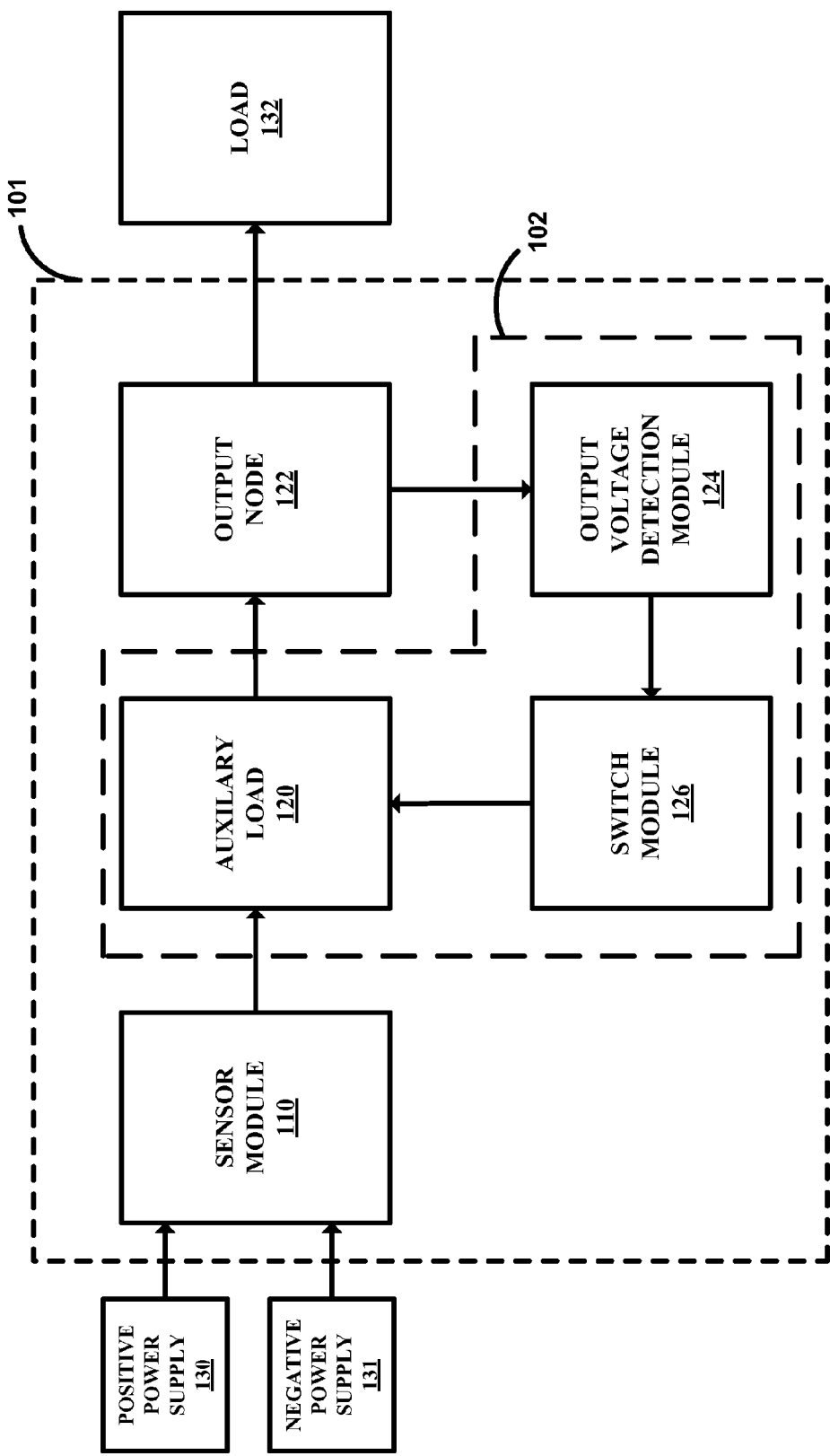
FIG. 1 is a block diagram that illustrates one example of a device/circuit that includes a sensor unit and a short protection unit consistent with the techniques of this disclosure.

FIG. 1 is a block diagram that illustrates one example of a short circuit-protected sensor device/circuit 101 consistent with the techniques of this disclosure. As depicted in FIG. 1, device/circuit 101 includes a sensor unit 110. A unit as described herein may refer to one or more electrical circuits, components, or devices configured to operate as the particular unit is described herein. A unit as described herein may further include any combination of hardware, software, or firmware (e.g., programmable logic) configured to operate as a particular unit is described herein.

Generally speaking, sensor unit 110 is configured to measure one or more values, and generate an output signal (e.g., an analog or digital signal) that indicates the one or more measured values. For example, sensor unit 110 may comprise a rotary position sensor. Such a rotary position sensor may utilize one or more magnetic properties (e.g., using a Hall effect or other magnetic sensor) to determine rotation of a rotating object such as an axle, steering wheel column, rotating shaft, or similar rotating member. In some examples, such rotary position sensors may be used for automotive or other industrial applications. While the techniques of this disclosure are described herein with respect to sensor units that include one or more rotary position sensors, other types of sensor configured to measure one or more properties and generate one or more signals indicative of measured properties are also contemplated for use with the described short protection unit and consistent with the techniques described herein.

As also shown in FIG. 1, sensor unit 110 may be communicatively coupled (via output node 122) to a load 132. Load 132 may include any circuitry or device configured to receive one or more signals indicative of measured properties (e.g., a signal indicative of rotation), and process, store, communicate, or otherwise use the received one or more signals. For example, load 132 may comprise an analog to digital converter (ADC) configured to receive one or more analog signals indicative of sensed properties and convert the received one or more analog signals into one or more digital signal that may be used by other circuitry communicatively coupled to the analog to digital converter. According to other examples, load 132 may include circuitry or devices configured to directly utilize one or more signals from sensor unit 110. For example, load 132 may be configured to receive one or more analog or digital (e.g., a pulse width modulated (PWM) signal) signals from sensor unit 110, and utilize the one or more analog or digital signals to generate graphical output for display, communicate the received one or more analog or digital signals, or otherwise utilize the received one or more signals.

As depicted in FIG. 1, sensor unit 110 and/or other components of device/circuit 101 may operate based on a supply voltage (positive power supply voltage 130, negative power supply voltage 131). In some examples, it may be desirable to protect sensor unit 110 from being shorted to one or more of positive power supply voltage 130 and/or negative power supply voltage 131.

For example, sensor unit 110 and/or other components of circuit/device 101 may be configured such that each of output node 122, positive power supply voltage 130, and negative power supply voltage 131 are coupled to sensor unit 110 via one or more conductive members (e.g., one or more wires). Such conductive members may or may not be coupled together in a unitary casing. In some examples, if one or more such conductive members become exposed (e.g., due to breaking/fraying/melting of insulation protecting the one or more conductive members) to one another, the conductive members may become shorted (e.g., electrically coupled) to one another. According to some examples, if output node 122 becomes shorted (e.g., electrically coupled) to one or more of positive power supply 130 and/or negative power supply 131, sensor unit 110 may not operate as desired. For example, sensor unit 110 may fail to provide one or more output signals indicative of measured properties, or may provide inaccurate output signals that do not correctly indicate measured properties. According to other examples, a short between output node 122 and one or more of positive power supply 130 and negative power supply 131 may damage sensor unit 110.

In some examples, sensor unit 110 may be configured to operate using one or more predefined supply voltage levels (e.g., voltage potential of positive power supply 130). For example, sensor unit 110 may be configured to operating using a 5 volt power supply (e.g., positive power supply 130 has a 5 voltage (V) potential, negative power supply 131 has a 0 V potential). According to other examples, sensor unit 110 may be configured to operate using a substantially higher power supply voltage level. As one specific example, sensor unit 110 may be configured to operate using a 30 volt or higher supply voltage level (e.g., positive power supply 130 has a 30.0 V potential, negative power supply 131 has a 0 V potential). In some examples, where sensor unit 110 is configured to operate using a 30V supply level, a short between output node 122 and positive power supply 130 may undesirably effect operation of sensor unit 110 to provide one or more signals indicative of measured properties. As such, it may be desirable to protect sensor unit 110 in case output node 122 becomes shorted to positive power supply 130.

According to one example, sensor unit 110 may be somewhat protected against a short to one or more of positive power supply 130 and/or negative power supply 131 by a series resistance (e.g., 1.7 kohms) between sensor unit 110 and output node 122 (coupled to additional circuitry 132). This technique may further include the use of one or more one or more clamps (e.g., a zener diode) coupled to the output node to limit current that may be caused by a short to one or more of positive power supply 130 and/or negative power supply 131. While such a technique may provide some protection against a power supply short, providing a series resistance may result in a relatively high output impedance at output node 122. According to this technique, in order to accurately communicate signals indicative of measured properties from sensor unit 110 to load 132, load 132 may include one or more high impedance buffers to match the high output impedance at output node 122 caused by the series resistance. In some examples, it may be undesirable for a user of sensor unit 110 to include such a high impedance buffer with load 132.

According to the example illustrated in FIG. 1, circuit/device 101 includes a short protection unit 102 consistent with the techniques of this disclosure. Generally speaking, short protection unit 102 may be configured to protect against a short between positive power supply 130 and output node 122. Short protection unit 102 may further be configured to enable sensor unit 110 to continue to operate as desired to provide one or more signals indicative of measured properties even if a short occurs between output node 122 and positive power supply 131, and even where positive power supply 131 has a relatively high voltage level (e.g., 30 volts). Furthermore, short protection unit 102 may eliminate a need for load 132 to include a high-impedance buffer as described above for impedance matching purposes when no short is present between output node 122 and positive power supply 130. As such, load 132 may merely coupled to output node 122, without including any circuits/components/devices for impedance matching purposes.

As depicted in FIG. 1, short protection unit 102 includes an auxiliary load 120, an output voltage detection unit (OVDM) 124, and a switch unit 126. In operation, output voltage detection unit 124 may be configured to determine a direct current (DC) output voltage at output node 122. For example, OVDM 124 may include a reference voltage and at least one comparator. The at least one comparator may be configured to compare a voltage at output node 122 to the reference voltage, and if a voltage at output node 122 is greater than the reference voltage, provide switch unit 126 with an indication that a short (e.g., between output node 122 and positive power supply 130) has been detected.

Figure 2:
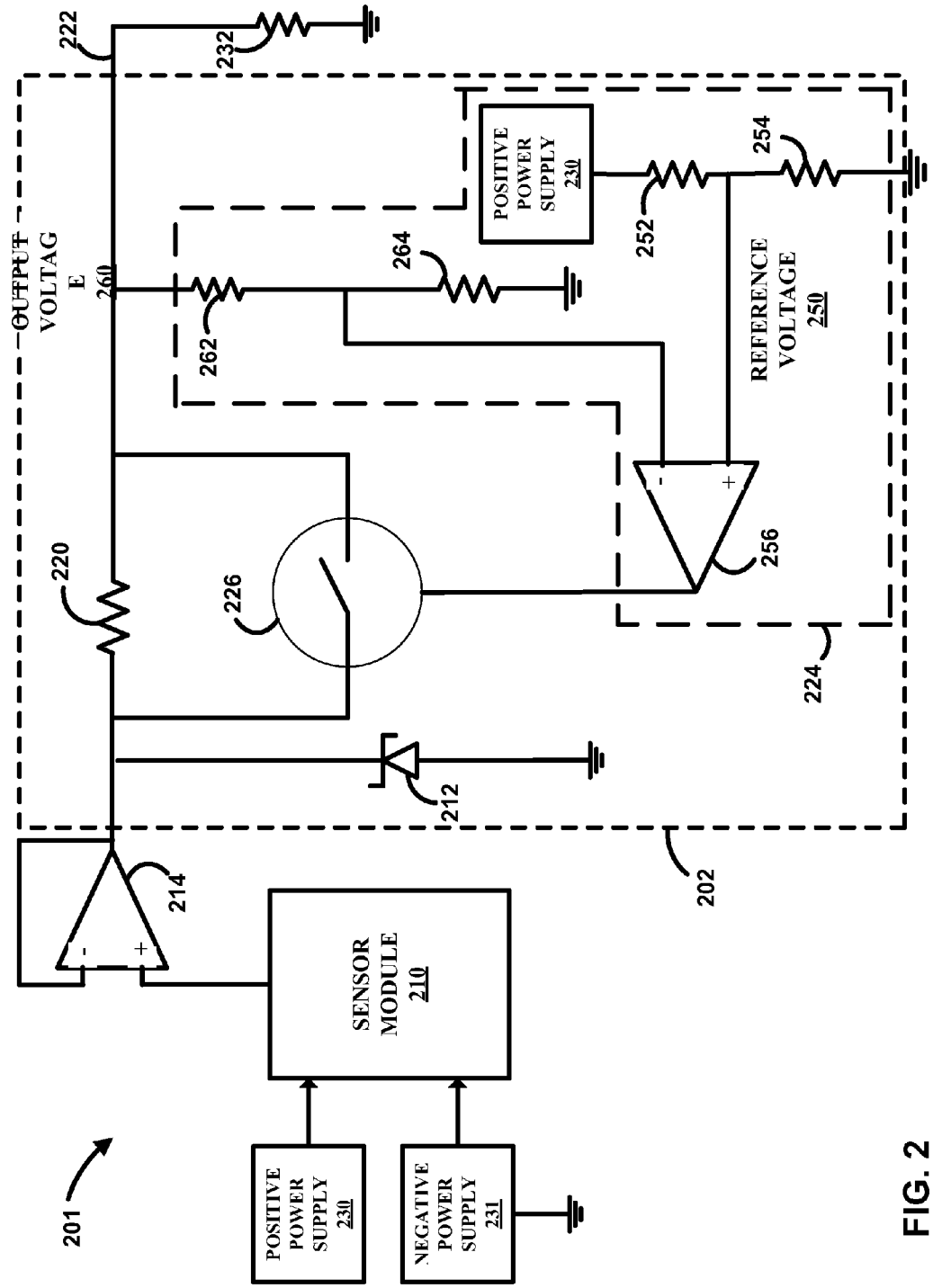
FIG. 2 is a circuit diagram that illustrates one example of a circuit/device that includes a sensor unit and a short protection unit consistent with the techniques of this disclosure.

Switch unit 126 may be configured to, when output voltage detection unit 124 indicates that a short has been detected, cause auxiliary load 120 to be provided in an electrical path between sensor unit 110 and output node 122. When a short has not been detected by output voltage detection unit 124, switch unit 126 may cause auxiliary load 120 not to be provided into the electrical path between sensor unit 110 and output node 122. By causing auxiliary load 120 to be provided into an electrical path between sensor unit 110 and output node 122 when a short has been detected by OVDM 124, switch unit 126 may enable device/circuit 101 to be protected against a short circuit between output node 122 and positive power supply 130, without requiring that load 132 include additional circuitry/devices/components for impedance matching purposes FIG. 2 is a circuit diagram that illustrates one example of a device/circuit 201 that includes a short protection unit 202 consistent with the techniques of this disclosure. As shown in FIG. 2, device/circuit 201 includes a sensor unit 210. As described above with respect to FIG. 1, sensor unit 210 operates based on a power supply input comprising positive power supply 230 and negative power supply 231. As also shown in FIG. 2, sensor unit 210 may communicate one or more signals indicative of measured properties to a load 232 via an output node 222.

As also shown in FIG. 2, an output of sensor unit 210 is coupled to a first input terminal of a differential amplifier 214. In one example, differential amplifier 214 comprises an instrumentation amplifier. As shown in FIG. 2, a second input terminal of differential amplifier 214 is coupled to an output of differential amplifier 214. In this configuration, differential amplifier amplifier 214 may be configured to provide a stable DC voltage level for one or more signals indicative of sensed properties generated by sensor unit 210.

As depicted in FIG. 2, short-circuit protection unit 202 is coupled between an output of differential amplifier 214 and output node 222 (coupled to load 232). Generally speaking, short-circuit protection unit 202 may be configured to protect sensor unit 210 in the case of a short (electrical coupling) between output node 222 and positive power supply 230.

As shown in FIG. 2, short-circuit protection unit 202 includes an output voltage detection unit (OVDM) 224, a switch unit 226, and an auxiliary load 220. OVDM 224 is configured to detect a voltage level at output node 222 and, based on a detected voltage level, determine whether or not output node 222 is shorted to positive power supply 230. According to the example of FIG. 2, OVDM 124 includes a differential amplifier 256. Differential amplifier 256 includes a first terminal coupled to a node between a first resistor 262 and a second resistor 264. As depicted in FIG. 2, a first terminal of first resistor 262 is coupled to output node 222, and a second terminal of second resistor 264 is coupled to ground (e.g., negative power supply 231). According to this configuration, first and second resistors 262, 264 may operate as a voltage divider to divide an output voltage 260 at output node 222 based on a ratio between a resistance of first resistor 262 and a resistance of second resistor 264.

As also shown in FIG. 2, a second input terminal of differential amplifier 256 is coupled to a node between a third resistor 252 and a fourth resistor 254. A first terminal of third resistor 252 is coupled to positive power supply 230, and a second terminal of third resistor 252 is coupled to a first terminal of fourth resistor 254. A second terminal of fourth resistor 254 is coupled to ground (e.g., negative power supply 231). According to this configuration, third and fourth resistors 252, 254 may operate as a voltage divider to divide positive power supply 230 to generate a reference voltage 250 for comparison by differential amplifier 256 to a divided output voltage 260 as described above. According to this example, reference voltage 250 may be generated based on a ratio between a resistance of third resistor 252 and a resistance of fourth resistor 254. The use of a voltage divider to generate a reference voltage for comparison as depicted in FIG. 2 is merely one example of a technique for generating reference voltage 250. Other techniques for generating reference voltage 250 are contemplated and consistent with the techniques described herein. For example, such reference voltage 250 may be generated from an additional power supply, using a potentiometer or similar device, or any other technique for defining a voltage that may be used as reference voltage 250.

According to the configuration depicted in FIG. 2, differential amplifier 256 may be configured to compare output voltage 260 (e.g., as divided by voltage divider comprising resistors 262, 264), to reference voltage 250. As depicted in FIG. 2, an output of differential amplifier 256 is coupled to a switch 226. Switch 226 may be configured to be controlled to be in an on or off state based on an output voltage level of differential amplifier 256. For example, switch 226 may be configured to transition from an on state to an off state when a voltage supplied to switch (e.g., by OVDM via differential amplifier 256) exceeds (or falls below) a threshold voltage level. According to the example depicted in FIG. 2, differential amplifier 256 may provide switch 226 with a voltage level that exceeds (or falls below) a threshold voltage when a comparison of output voltage 260 to reference voltage 250 indicates that a short has occurred between output node 222 and positive power supply 230.

In one example, switch 226 may comprise a transistor (e.g., a metal oxide semiconductor field effect transistor (MOSFET), bipolar junction transistor (BJT)) configured to turn off (e.g., not allow current to pass) when a voltage level supplied to the transistor exceeds (or falls below) a threshold voltage of the transistor. According to this example, when output voltage 260 exceeds a threshold value (e.g., reference voltage 250), differential amplifier 256 may supply switch 226 (e.g., a transistor) with a voltage that exceeds (or falls below) a threshold voltage of the transistor. Accordingly, switch 226 (e.g., the transistor) may transition from an on state to an off state.

As depicted in FIG. 2, switch 226 is coupled in parallel to an auxiliary load 220. In the example depicted in FIG. 2, auxiliary load 220 is a resistor. However, in other examples auxiliary load may include any other form of load, whether active or passive. For example, auxiliary load 220 may include any combination of capacitive, inductive, resistive, or any other electrical component that may function as an auxiliary load 220 for purposes of the techniques of this disclosure.

According to the example of FIG. 2, switch 226 may transition between an on and an off state, depending on an input signal supplied by OVDM 224. In an on state, switch 226 may cause electrical current to bypass auxiliary load 220 (e.g., current flows through switch 226). In such an on state, current flowing from sense unit 210 to output node 222 may experience little or no resistance. According to this example, where switch 226 is in an on state, sense unit 210 may generate one or more signals indicative of measured properties. Load 232 may receive the one or more signals indicative of measured properties, without any additional circuitry or devices for impedance matching purposes.

In an off state, switch 226 may act as an open circuit and allow little or no current to flow through switch 226. Instead, current may flow through auxiliary load 220. Current flowing through auxiliary load 220 (instead of through switch 226) may serve to protect sense unit 210 from a short between output node 222 and positive power supply 230. For example, instead of excess voltage/current from positive power supply 230 being input to sense unit 210, such excess voltage/current may be directed to auxiliary load 220, and thereby reduce an amount of excess voltage/current that may damage or otherwise affect sensor unit 210.

As also shown in FIG. 2, short protection unit 202 includes a zener diode 212 coupled between an output of differential amplifier 214 (coupled to a first terminal of resistor 220) and ground. In operation, diode 212 may operate as a clamp to limit an amount of current that may affect sensor unit 212.

By opening and closing switch 226 in response to detecting whether or not a short has occurred between output node 222 and positive power supply 230, short protection unit 202 may protect sense unit 210 when such a short has occurred by placing excess current and/or voltage across auxiliary load 220. Such excess current and/or voltage may be dissipated as heat. Furthermore, by removing (e.g., causing current to flow through switch 226) auxiliary load 220 from a path between sense unit 210 and output node 222, when no short has occurred between output node 222 and positive power supply 230, sense unit 210 may effectively communicate one or more indications of measured properties to load 232, without load 232 including any circuitry or devices for impedance matching purposes. As such, sensor unit 210 may be simpler to implement by a user of sensor unit 210.

Figure 3:
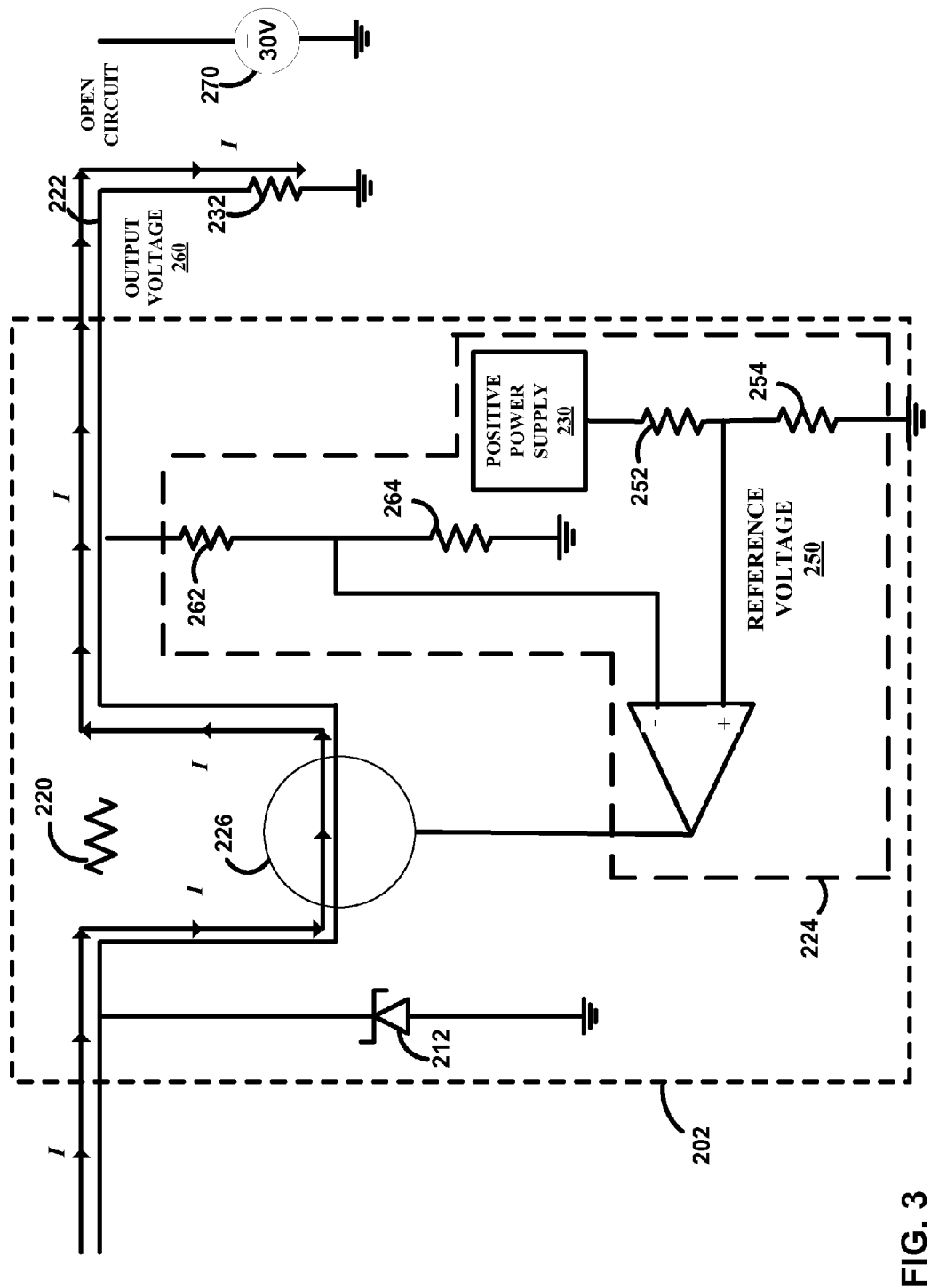
FIG. 3 is a circuit diagram that illustrates one example of a short protection unit in operation when no short has been detected between a sensor unit and an output node consistent with the techniques of this disclosure.

FIG. 3 is a circuit diagram that illustrates one example of device circuit 201 operating when no short has been detected between positive power supply 230 and output node 222 consistent with the techniques of this disclosure. For purposes of clarity in FIG. 3, positive power supply 230, negative power supply 231, sensor unit 214, and differential amplifier 214 depicted in FIG. 2 are not shown in FIG. 3, however positive power supply 230, negative power supply 231, sensor unit 214, and differential amplifier 214 depicted in FIG. 2 are described with reference to FIG. 3.

As represented by the lack of electrical connection between 30V supply 270 (representing a voltage of positive power supply 230) and output node 222, output node 222 is not shorted to positive power supply 230. Accordingly, OVDM 224 may communicate to switch 226 at least one signal indicating that a short has not been detected at output node 222. Accordingly, switch 226 may operate in an on state. Because switch 226 is operating in an on state, current I flows through switch instead of auxiliary load 220, effectively removing auxiliary load 222 from a path between sensor unit 210 and output node 222. According to the example shown in FIG. 2, because auxiliary load 220 is effectively removed from the path between sensor unit 210 and output node 222, sensor unit 210 may communicate one or more signals indicative of measured properties to load 232, without load 232 including additional circuitry for impedance matching purposes.

Figure 4:
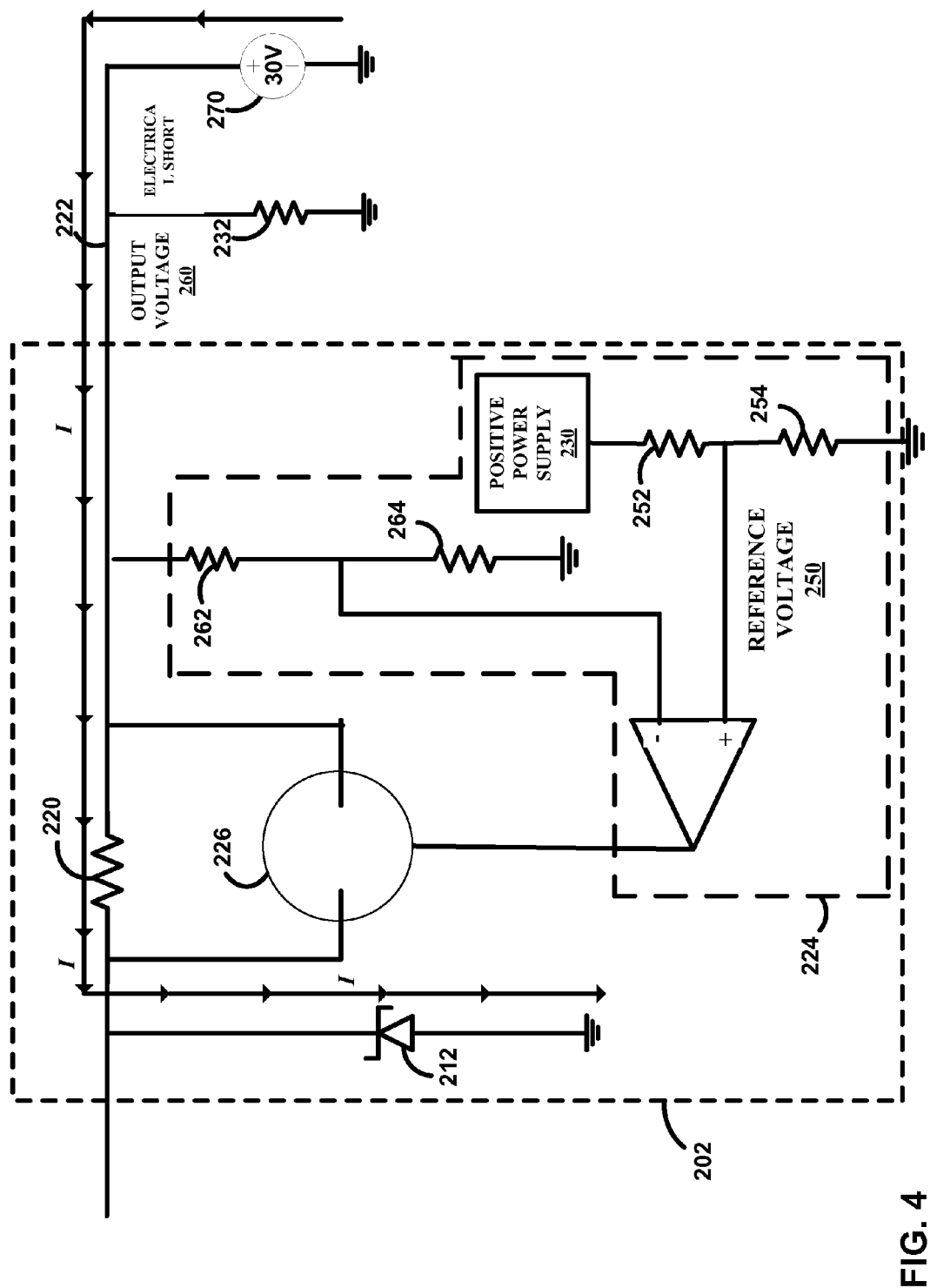
FIG. 4 is a circuit diagram that illustrates one example of a short protection unit in operation when a short has been detected between a sensor unit and an output node consistent with the techniques of this disclosure.

FIG. 4 is circuit diagram that illustrates one example of device/circuit 201 operating when a short has been detected between positive power supply 230 and output node 222 consistent with the techniques of this disclosure. For purposes of brevity, positive power supply 230, negative power supply 231, sensor unit 214, and differential amplifier 214 depicted in FIG. 2 are not shown in FIG. 4, however positive power supply 230, negative power supply 231, sensor unit 214, and differential amplifier 214 depicted in FIG. 2 are described with reference to FIG. 4.

As represented by the electrical connection between 30V DC voltage source 270 (representing a voltage of positive power supply 230) in FIG. 4, output node 222 is electrically coupled (shorted) to positive power supply 230. As represented by current I in FIG. 4, when shorted to output node 222, positive power supply 230 may cause a current I to flow in an opposite direction as opposed to current I illustrated in FIG. 3. Without short protection unit 202, current I (and corresponding voltage) illustrated in FIG. 3 may undesirably effect operation of sensor unit 210 and/or damage sensor unit 210. However, as shown in FIG. 4, OVDM 224 may detect, based on comparison of output voltage 260 to reference voltage 250, that output voltage 260 is higher than a predetermined threshold (e.g., defined by reference voltage 250), and therefore a short has occurred between output node 222 and positive power supply 230. Switch 226 may receive an indication that a short has been detected from OVDM 224 and, as a result switch 226 may transition to an off state. In an off state, switch 226 may represent an open circuit, and thereby cause current I (from the short (e.g., 30V DC source 270) to pass through auxiliary load 220. In addition, zener diode 212 may operate to clamp current I. In combination, auxiliary load 220 and zener diode 212 may prevent at least some of current I from reaching sensor unit 210, and thereby prevent current I from detrimentally effecting operation of sensor unit 210 and/or damaging sensor unit 210.

In some examples, short protection unit 202 may be configured to transition between a mode where a short is detected at output node 222 as depicted in FIG. 4, and a mode where no short is detected at output node 222 as depicted in FIG. 3. For example, insulative sheathing that protects conductive members that respectively couple positive power supply 230 and output node 222 to sensor unit 210 may become damaged and cause a short between power supply 230 and output node 222. A technician or other user may repair the damaged sheathing, thereby removing the short. According to this example, OVDM 224 may detect that the short has been removed, and thereby cause switch 226 to close such that auxiliary load 220 is removed from a current path between sensor unit 210 and output node 222. Because sensor unit 222 was protected by short protection unit 202, sensor unit 210 may continue to operate as desired once the insulative sheathing has been repaired and the short removed.

Figure 5:
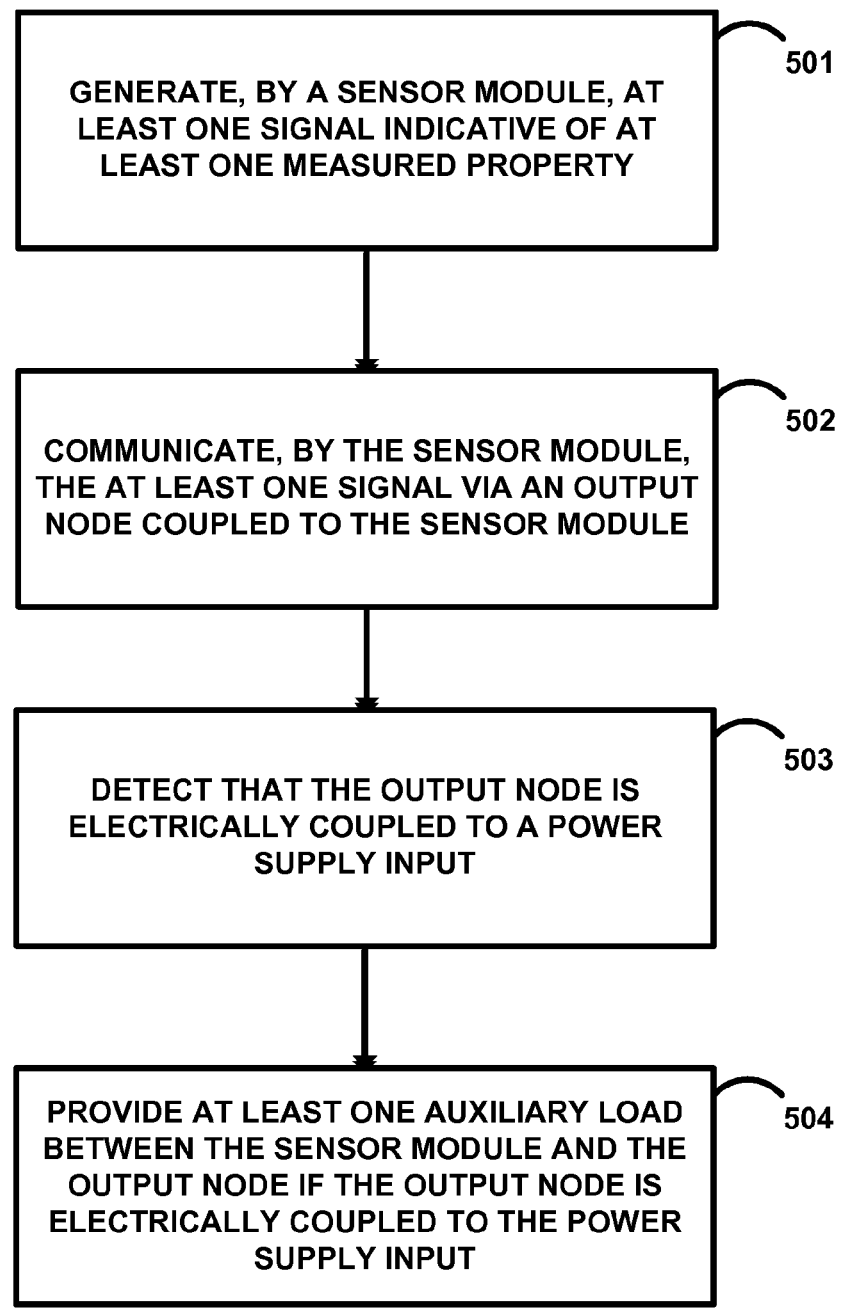
FIG. 5 is a flow chart that illustrates one example of a method for protecting a sensor unit from a power supply short consistent with the techniques of this disclosure.

FIG. 5 is a flow diagram that illustrates one example of a method of protecting a sensor unit consistent with the techniques of this disclosure. As depicted in FIG. 5, sensor unit 110, 210 may generate at least one signal indicative of at least one measured property (501). As described above with respect to FIG. 1, according to one example such a measured property may include rotational position information from a rotary position sensor. As also depicted in FIG. 5, sensor unit 110, 210 may communicate the at least one generated signal via an output node 122, 222) communicatively coupled to the sensor unit (502). In some examples, sensor unit 110, 210 may be powered based on a power supply input (e.g., positive power supply 230, negative power supply 231).

As also depicted in FIG. 5, a short protection unit 102, 202 (e.g., via OVDM 124, 224) may detect whether output node 122, 222 is electrically coupled to a power supply input (e.g., positive power supply 230) (503). For example, OVDM 224 may compare an output voltage 260 to a predetermined threshold (e.g., reference voltage 250) to determine whether output node 122, 222 is electrically coupled to positive power supply input 230.

As also depicted in FIG. 5, short protection unit 102, 202 (e.g., via switch 126, 226) may provide an auxiliary load 120, 220 between the sensor unit 110, 210 and output node 122, 222 if output node 122, 222 is electrically coupled to the power supply input (e.g., positive power supply 230) (504). In some examples, switch 126, 226 may be operable to provide or remove auxiliary load 120, 220 between sensor unit 110, 210 and output node 122, 222 based on whether OVDM 224 has detected a short between output node 122, 222 and positive power supply input 230.

For example, in a closed state, switch 126, 226 may operate to remove auxiliary load 120, 220 by causing an alternate current path around auxiliary load 120, 220, such that little or no current from sensor unit 110, 120 passes through auxiliary load 120, 220. According to this example, in an open state switch 126, 226 may operate to cause current from a short between positive power supply 130, 230 and output node 122, 222 to pass through auxiliary load 120, 220, such that an amount of current that reaches sensor unit 110, 210 is minimized or eliminated, thereby protecting sensor unit 110, 210 from operating undesirably or being damaged or destroyed as a result of a short between positive power supply 130, 230 and output node 122, 222.

Various examples have been described herein. These and other examples are within the scope of the following claims.

The invention claimed is

1. A method, comprising:
generating, by a sensor unit, at least one signal indicative of at least one measured property, wherein the sensor unit is operated based on power received via at least one power supply input;
communicating, by the sensor unit, the at least one signal via an output node coupled to the sensor unit;
determining whether the output node is electrically coupled to the power supply input; and
providing at least one auxiliary load between the sensor unit and the output node if the output node is electrically coupled to the power supply input.

2. The method of claim 1, wherein providing the at least one auxiliary load between the sensor unit and the output node comprises protecting the sensor unit from current caused by the output node being electrically coupled to the power supply input.

3. The method of claim 1, further comprising:
removing the at least one auxiliary load between the sensor unit and the output node if the output node is not electrically coupled to the power supply input.

4. The method of claim 3, wherein removing the at least one auxiliary load between the sensor unit and the output node comprises closing a switch.

5. The method of claim 4, wherein closing the switch provides a current path bypassing the at least one auxiliary load.

6. The method of claim 1, wherein providing the at least one auxiliary load between the sensor unit and the output node comprises opening a switch.

7. The method of claim 1, wherein detecting that the output node is electrically coupled to the power supply input comprises determining a voltage level at the output node.

8. The method of claim 1, wherein determining a voltage level at the output node comprises comparing the voltage level at the output node to a reference voltage.

9. The method of claim 1, wherein the at least one auxiliary load comprises a resistor.

10. A device, comprising:
a sensor unit configured to generate at least one signal indicative of at least one measured property and communicate the at least one signal via an output node coupled to the sensor unit, wherein the sensor unit is operated based on power received via at least one power supply input;
an output voltage detection unit configured to determine whether the output node is electrically coupled to the at least one power supply input; and
a switch unit configured to provide at least one auxiliary load between the sensor unit and the output node if the output node is electrically coupled to the at least one power supply input.

11. The device of claim 10, wherein the device protects the sensor unit from current caused by the output node being electrically coupled to the power supply input.

12. The device of claim 10, wherein the switch unit is further configured to:
remove the at least one auxiliary load between the sensor unit and the output node if the output node is not electrically coupled to the power supply input.

13. The device of claim 12, wherein the switch unit is configured to remove the at least one auxiliary load via closing a switch.

14. The device of claim 10, wherein the switch unit is configured to provide the at least one auxiliary load between the sensor unit and the output node by opening a switch.

15. A device, comprising:
means for generating at least one signal indicative of at least one measured property, wherein the means for generating is operated based on power received via at least one power supply input;
means for communicating the at least one signal via an output node coupled to the means for generating;
means for determining whether the output node is electrically coupled to the at least one power supply input; and
means for providing at least one auxiliary load between the means for generating and the output node if the output node is electrically coupled to the at least one power supply input.

16. The device of claim 15, wherein the device protects the sensor unit from current caused by the output node being electrically coupled to the power supply input.

17. The device of claim 15, further comprising:
means for removing the at least one auxiliary load between the sensor unit and the output node if the output node is not electrically coupled to the power supply input.

18. The device of claim 17, wherein the means for removing the at least one auxiliary load comprise means for closing a switch.

19. The device of claim 15, wherein the means for providing at least one auxiliary load between the means for generating and the output node provide at least one auxiliary load via opening a switch.

* * * * *